United States Patent Office 3,491,042
Patented Jan. 20, 1970

3,491,042
STABILIZED POLYAMIDE COMPOSITION CONTAINING COPPER SALTS AND METAL CYANIDES
Karl Heinz Hermann, Krefeld-Bockum, Germany, assignor to Farbenfabriken Bayer Aktiengesellschaft, Leverkusen, Germany, a corporation of Germany
No Drawing. Filed Mar. 3, 1967, Ser. No. 620,276
Claims priority, application Germany, Mar. 12, 1966,
F 48,648
Int. Cl. C08g 51/56, 51/62
U.S. Cl. 260—18
7 Claims

ABSTRACT OF THE DISCLOSURE

A polyamide composition stabilized against degradative effects of heat and oxygen, containing as stabilizers a combination of inorganic or organic copper salt and a salt of hydrocyanic acid and optionally in addition thereto, an iodine compound or a phosphorous compound.

---

The present invention relates to polyamides which are stabilized by means of a combination of copper compounds and salts of hydrocyanic acid. Shaped articles, such as filaments, bristles, foils etc. made of polyamides which have been obtained by polymerisation of diamines and dicarboxylic acids, or of aminocarboxylic acids of their lactams show a reduction in their relative viscosities and an impairment of their mechanical strength and elongation properties, when subjected to the action of air and oxygen especially at elevated temperatures. At the same time, the polyamide undergoes increasing brown discoloration.

It is already known that polyamides may be protected against the damaging effects of air and oxygen at elevated temperatures by the addition of stabilisers. Examples of compounds which have already been proposed for use as stabilisers are as follows: Manganese salts of inorganic and organic acids, copper salts of inorganic and organic acids, derivatives of oxyacids of phosphorus, aromatic amines and phenols. The use of combinations of these groups of compounds with each other or with compounds such as alkali metal halides, alkaline earth halides, iodine, arylsulphonic acids, mercaptobenzimidazole etc. which when used alone have no stabiliser effect, has been found to be preferable.

The stabilisers hitherto used have the disadvantage that either their stabilising effect is not sufficient, as in the case of manganese salts, phosphorus compounds and phenols, or that they are sensitive to light and therefore cause discoloration of the polyamide in the course of time, e.g. aromatic amines and phenols.

The addition of copper salts, which are highly effective stabilisers, leads to discoloration of the polyamide. In addition, when polyamides stabilised with the copper stabilisers hitherto known are coloured with pigments containing sulphur or selenium, e.g. cadmium sulphide; cadmium selenide, ultramarine, etc., it is not possible to obtain pure colour tones but only discolored yellow, red, blue and mixed colour tones owing to the small quantities of sulphides or selenides of monovalent or divalent copper formed as a result of reaction between copper compounds and pigment. The stabilising effect diminishes in proportion to this discoloration.

It has now been found that polyamides can be stabilised without the above mentioned disadvantages by using as stabiliser a combination of a copper compound with a salt of hydrocyanic acid. Examples of such salts of hydrocyanic acid are: Alkali metal cyanides, alkaline earth cyanides, substituted or unsubstituted ammonium cyanides, $Zn(CN)_2$, $Cd(CN)_2$, $Ph(CN)_2$, TlCN and double salts such as $K_2Cd(CN)_4$ and $K_2Zn(CN)_4$. Examples of copper compounds which may be used are salts of inorganic acids such as $Cu(II)Cl_2$, $Cu(I)Cl$, $Cu(II)Br_2$, $Cu(I)Br$, $Cu(I)I$, $Cu(I)CN$, $Cu(II)SO_4$ etc., salts of organic carboxylic acids, e.g., Cu-acetate, Cu-stearate, Cu-benzoate etc., salts of monofunctional of polyfunctional phenols, and furthermore, complex compounds of these copper salts with ammonia, amines, amides, lactams, phosphites, phosphines etc. The cyanides may be added in such quantity that the molar ratio of CN:Cu is from 1:10 to 50:1, preferably from 1:2 to 20:1.

The copper compounds are advantageously added in such a quantity that the polyamide contains 0.0001–0.2 and preferably 0.001–0.02% by weight of copper. The stabiliser effect can be increased by the addition of halogen compounds, preferably iodine compounds, and/or phosphorus compounds, e.g. by the addition of alkali metal iodides or alkaline earth iodides, iodides of strong organic bases, polyiodides, iodine, aromatic iodine compounds, phosphites and phosphines. The iodine compound or the phosphorus compound may be added in amounts of between 0.01 to 5% by weight based on the total weight of the polyamide composition.

The stabilisers may be added to the polyamide forming starting mixture before polymerisation, and polymerisation may then be carried out in known manner, either continuously or batchwise; alternatively, the stabiliser combination, either all the components together or separately and if desired in the form of a concentrate in polyamide, may be mixed to the polyamide melt during or after polymerisation. The usual mixing devices, such as extruders, kneaders, stirrers etc., may be used for this operation. The usual additives, such as pigments, dyes, light stabilisers, optical brightening agents, fillers such as glass fibres or asbestos fibres, lubricants and mould parting agent, plasticisers, crystallising agents, fillers such as the polyamides in addition to stabilisers. The polyamides which have been stabilised according to the invention, especially against damage by oxidation at elevated temperatures, are particularly suitable for use in production of artificial silk for fishing nets, drive belts, conveyor belts, conveyor bands etc., tyre cords and moulded articles which are exposed to heat within the presence of air or oxygen.

The following examples illustrate more particularly the invention.

EXAMPLE 1

1 kg. of a colourless polycaprolactam of relative viscosity 3.12 (measured on a 1% by weight solution in m-cresol at 25° C. in an Ubbelohde Viscosimeter) which has been prepared in the usual way is melted in a conventional screw extruded and is at the same time homogeneously mixed with various stabilisers. The polycaprolactam which contains stabiliser is spun to form a bristle of about 3 mm. diameter, which is then chopped up to form a granulate and dried. The granulate is then stored in a drying cupboard at 150° C. with free access of air, and its relative viscosity is measured after 144, 500 and 1,000 hours.

The results of the tests are shown in Table I.

TABLE I

| Serial No. | Copper compound | G. | Percent Cu in polyamide | Further additives | G. | Percent | Cyanide | G. | Molar ratio Cu:CN | Colour of polyamide | Relative viscosity after— | | | |
|---|---|---|---|---|---|---|---|---|---|---|---|---|---|---|
| | | | | | | | | | | | Mixing | 144 hours | 500 hours | 1,000 hours |
| 1 | Cu(I)I | 0.36 | 0.012 | | | | KCN | 0.46 | 1:4 | Colourless | 3.24 | 3.19 | 3.01 | 2.68 |
| 2 | Cu(I)I | 0.36 | 0.012 | | | | KCN | 0.92 | 1:8 | do | 3.22 | 3.15 | 2.94 | 2.60 |
| 3 | Cu(I)I | 0.36 | 0.012 | KI | 2.0 | 0.2 | KCN | 0.92 | 1:8 | do | 3.22 | 4.12 | 3.84 | 3.62 |
| 4 | Cu(I)I | 0.36 | 0.012 | KI | 2.0 | 0.2 | Zn(CN)$_2$ | 0.83 | 1:8 | do | 3.18 | 4.05 | 3.80 | 3.52 |
| 5 | Cu(I)I | 0.36 | 0.012 | KI | 2.0 | 0.2 | Zn(CN)$_2$ | 0.66 | 1:16 | do | 3.20 | 4.01 | 3.75 | 3.47 |
| 6 | Cu(II)-acetate·H$_2$O | 0.34 | 0.012 | KI | 2.0 | 0.2 | KCN | 0.92 | 1:8 | do | 3.19 | 3.96 | 3.69 | 3.34 |
| 7 | Cu(II)Cl$_2$ | 0.25 | 0.012 | KI | 2.0 | 0.2 | KCN | 0.84 | 1:16 | do | 3.16 | 3.92 | 3.65 | 3.32 |
| 8 | | | | | | | | | | | 3.09 | 2.73 | 2.36 | 2.18 |

EXAMPLE 2

The procedure carried out is the same as that of Example 1, except that 3.5 g. of a cadmium sulphide pigment (Yellow 6G) are mixed in with the polyamide at the same time as the stabilisers. The colours of the products obtained are indicated in Table II.

TABLE II

| Serial No. | Copper compound | G. | Percent Cu in polyamide | Other additives | G. | Percent | Cyanide | G. | Molar ratio Cu:CN | Colour of polyamide |
|---|---|---|---|---|---|---|---|---|---|---|
| 1 | Cu(I)I | 0.36 | 0.012 | | | | KCN | 0.46 | 1:4 | Pure yellow. |
| 2 | Cu(I)I | 0.36 | 0.012 | | | | KCN | 0.92 | 1:8 | Pure yellow, like 1. |
| 3 | Cu(I)I | 0.36 | 0.012 | KI | 2.0 | 0.2 | KCN | 0.92 | 1:8 | Do. |
| 4 | Cu(I)I | 0.36 | 0.012 | KI | 2.0 | 0.2 | Zn(CN)$_2$ | 0.83 | 1:8 | Do. |
| 5 | Cu(I)I | 0.36 | 0.012 | KI | 2.0 | 0.2 | Zn(CN)$_2$ | 1.66 | 1:16 | Do. |
| 6 | Cu(I)I | 0.36 | 0.012 | Triphenylphosphine | 0.5 | 0.05 | KCN | 0.92 | 1:8 | Do. |
| 7 | Cu(I)I | 0.36 | 0.012 | Tridecylphosphite | 1.0 | 0.1 | KCN | 0.92 | 1:8 | Do. |
| 8 | Cu(I)I | 0.36 | 0.012 | KI | 2.0 | 0.2 | KCN | 1.84 | 1:16 | Do. |
| 9 | Cu(II)-acetate·H$_2$O | 0.34 | 0.012 | KI | 2.0 | 0.2 | KCN | 1.84 | 1:16 | Do. |
| 10 | Cu(II)Cl$_2$ | 0.25 | 0.012 | KI | 2.0 | 0.2 | KCN | | | Dirty, yellow-brown. |
| 11 | Cu(I)I | 0.36 | 0.012 | | | | | | | Do. |
| 12 | Cu(I)I | 0.36 | 0.012 | KI | 2.0 | 0.2 | | | | Do. |
| 13 | Cu(I)I | 0.36 | 0.012 | Triphenylphosphine | 0.5 | 0.05 | | | | Do. |
| 14 | Cu(I)I | 0.36 | 0.012 | Tridecylphosphite | 1.0 | 0.1 | | | | Do. |
| 15 | Cu(II)acetate·H$_2$O | 0.34 | 0.012 | KI | 2.0 | 0.2 | | | | Do. |
| 16 | Cu(II)Cl$_2$ | 0.25 | 0.012 | KI | 2.0 | 0.2 | | | | Do. |

EXAMPLE 3

A mixture of 1.0 kg. caprolactam, 35 g. ε-aminocaproic acid and a stabiliser combination is polycondensed in an autoclave in the usual manner at a temperature of 270° C. The colour of the polyamide obtained is indicated in Table III.

TABLE III

| Serial No. | Copper compound | G. | Percent Cu in polyamide | Other additives | G. | Percent | Cyanide | G. | Molar ratio Cu:CN | Colour of polyamide |
|---|---|---|---|---|---|---|---|---|---|---|
| 1 | Cu(I)Br | 0.27 | 0.012 | | | | KCN | 0.92 | 1:8 | Colourless. |
| 2 | Cu(II)acetate·H$_2$O | 0.34 | 0.012 | | | | Zn(CN)$_2$ | 1.66 | 1:16 | Do. |
| 3 | Cu(II)Cl$_2$·H$_2$O | 0.32 | 0.012 | | | | KCN | 1.84 | 1:16 | Do. |
| 4 | Cu(I)Br | 0.27 | 0.012 | | | | | | | Green grey. |
| 5 | Cu(II)acetate·H$_2$O | 0.34 | 0.012 | | | | | | | Red grey. |
| 6 | Cu(II)Cl$_2$·2H$_2$O | 0.32 | 0.012 | | | | | | | Green. |
| 7 | Cu(II)Cl$_2$·2H$_2$O | 0.32 | 0.012 | KI | 5.0 | 0.5 | | | | Do. |
| 8 | Cu(II)acetate·H$_2$O | 0.34 | 0.012 | Tridecylphosphite | 1.0 | 0.1 | | | | Blue red. |
| 9 | do | 0.34 | 0.012 | H$_3$PO$_3$ | 0.3 | 0.03 | | | | Grey black. |

What I claim is:
1. A polyamide composition containing a copper compound selected from the group consisting of CuCl$_2$, CuCl, CuBr$_2$, CuBr, CuI, CuCN, CuSO$_4$, copper acetate, copper stearate, and copper benzoate, in an amount of 0.0001 to 0.2% based on the total weight of the polyamide composition of copper and a salt of hydrocyanic acid selected from the group consisting of alkali metal cyanide, an alkaline earth metal cyanide, Zn(CN)$_2$, Cd(CN)$_2$, Pb(CN)$_2$, TlCN, K$_2$Cd(CN)$_4$ and K$_2$Zn(CN)$_4$, in an amount such that the molar ratio of CN to Cu is in the range from 1:10 to 50:1.

2. The polyamide composition of claim 1, wherein said copper compound is selected from the group consisting of CuCl$_2$, CuBr, CuI and copper acetate, said salt of hydrocyanic acid being selected from the group consisting of KCN and Zn(CN)$_2$.

3. A polyamide composition containing
(a) a copper compound selected from the group consisting of CuCl$_2$, CuCl, CuBr$_2$, CuBr, CuI, CuCN, CuSO$_4$, copper acetate, copper stearate and copper benzoate, in an amount of 0.0001 to 0.2% based on the total weight of the polyamide composition of copper.
(b) a salt of hydrocyanic acid selected from the group consisting of an alkali metal cyanide, an alkaline earth metal cyanide, Zn(CN)$_2$, Cd(CN)$_2$, Pb(CN)$_2$, TlCN, K$_2$Cd(CN)$_4$, and K$_2$Zn(CN)$_4$, in an amount such that the molar ratio of CN to Cu is in the range from 1:10 to 50:1, and
(c) 0.01 to 5% based on the total weight of the polyamide composition of an iodine compound selected from the group consisting of an alkali metal iodide, an alkaline earth metal iodide, and iodine.

4. The polyamide composition of claim 3, wherein said copper compound is selected from the group consisting of CuCl$_2$, CuBr, CuI and copper acetate, said salt of hydrocyanic acid is selected from the group consisting of KCN and Zn(CN)$_2$, and said iodine compound is potassium iodide.

5. A polyamide composition containing
(a) a copper compound selected from the group consisting of CuCl$_2$, CuCl, CuBr$_2$, CuBr, CuI, CuCN, CuSO$_4$, copper acetate, copper stearate and copper benzoate, in an amount of 0.0001 to 0.2% based on the total weight of the polyamide composition of copper,
(b) a salt of hydrocyanic acid selected from the group consisting of an alkali metal cyanide, an alkaline earth metal cyanide, Zn(CN)$_2$, Cd(CN)$_2$, Pb(CN)$_2$, TlCN, K$_2$Cd(CN)$_4$, and K$_2$Zn(CN)$_4$, in an amount such that the molar ratio of CN to Cu is in the range from 1:10 to 50:1, and
(c) 0.01 to 5% based on the total weight of the polyamide composition of a phosphorus compound selected from the group consisting of a phosphite and a phosphine.

6. The polyamide composition of claim 5, wherein said copper compound is selected from the group consisting of CuCl$_2$, CuBr, CuI and copper acetate, said salt of hydrocyanic acid is selected from the group consisting of KCN and Zn(CN)$_2$, and said phosphorous compound is tridecylphosphite.

7. The polyamide composition of claim 5, wherein said copper compound is selected from the group consisting of CuCl$_2$, CuBr, CuI and copper acetate, said salt of hydrocyanic acid is selected from the group consisting of KCN and Zn(CN)$_2$, and said phosphorous compound is triphenylphosphine.

References Cited

UNITED STATES PATENTS

| | | | |
|---|---|---|---|
| 2,510,777 | 6/1950 | Gray | 260—45.7 |
| 2,705,227 | 3/1955 | Stamatoff | 260—45.7 |
| 3,340,227 | 9/1967 | Krieger | 260—45.75 |

FOREIGN PATENTS

| | | |
|---|---|---|
| 906,893 | 2/1946 | France. |
| 839,067 | 6/1960 | Great Britain. |

DONALD E. CZAJA, Primary Examiner

V. P. HOKE, Assistant Examiner

U.S. Cl. X.R.

260—37, 45.7, 45.75, 45.9

UNITED STATES PATENT OFFICE
CERTIFICATE OF CORRECTION

Patent No. 3,491,042                     Dated January 20, 1970

Inventor(s) Karl Heinz Hermann

It is certified that error appears in the above-identified patent and that said Letters Patent are hereby corrected as shown below:

| COLUMN | LINE | ERROR |
|---|---|---|
| 4 | Table I Column G. after Cyanide | "0.66" should read ---1.66---. |
| 3 | 42 | "0.84" should read ---1.84---. |
| 4 | 16 | "Zn(CN)$_2$ should read ---Zn(ZN)$_2$- |

SIGNED AND SEALED
SEP 22 1970

(SEAL)
Attest:

Edward M. Fletcher, Jr.
Attesting Officer

WILLIAM E. SCHUYLER, JR.
Commissioner of Patents